(12) United States Patent
Mayakontla et al.

(10) Patent No.: US 10,868,805 B2
(45) Date of Patent: Dec. 15, 2020

(54) ENHANCED MANAGEMENT OF PASSWORDS FOR PRINTING APPLICATIONS AND SERVICES

(71) Applicant: MICROSOFT TECHNOLOGY LICENSING, LLC, Redmond, WA (US)

(72) Inventors: Pradeep Mayakontla, Bellevue, WA (US); Kara Lane Ottewell, Redmond, WA (US); Priya Amod Samnerkar, Redmond, WA (US); Lakshmi Narayana Mummidi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 608 days.

(21) Appl. No.: 15/365,847

(22) Filed: Nov. 30, 2016

(65) Prior Publication Data

US 2017/0366533 A1 Dec. 21, 2017

Related U.S. Application Data

(60) Provisional application No. 62/351,253, filed on Jun. 16, 2016.

(51) Int. Cl.
*H04L 9/32* (2006.01)
*H04L 29/06* (2006.01)
(Continued)

(52) U.S. Cl.
CPC .......... *H04L 63/083* (2013.01); *G06F 21/608* (2013.01); *G06F 21/6209* (2013.01); *H04L 63/061* (2013.01)

(58) Field of Classification Search
CPC .... G06F 3/1222; G06F 3/1293; G06F 3/1294; G06F 3/1238; H04L 63/083
(Continued)

(56) References Cited

U.S. PATENT DOCUMENTS 6,205,549 B1 3/2001 Pravetz
7,528,978 B2 5/2009 Randt
(Continued)

FOREIGN PATENT DOCUMENTS

JP 2003308194 A 10/2003

OTHER PUBLICATIONS

Karasneh et al, Integrating Schemas of Heterogeneous Relational Databases through Schema Matching, Dec. 16, 2009, ACM, pp. 209-216.*
(Continued)

*Primary Examiner* — Alexander Lagor
*Assistant Examiner* — Jenise E Jackson
(74) *Attorney, Agent, or Firm* — Newport IP, LLC; Scott Y. Shigeta

(57) ABSTRACT

Techniques described herein provide enhanced management of passwords for applications and services. Generally described, the techniques disclosed herein leverage the strength of existing security measures built into operating systems to generate and communicate encrypted passwords to enable components of a computing system to operate with a heightened level of security. In some configurations, the encryption of a password using strong keys that are associated with an identity improve the security of a computing device as well as improve the security, processing, and communication of secured documents and printing schemas. In some configurations, passwords for accessing documents are encrypted and embedded in printing schemas. The encrypted password is communicated between modules of
(Continued)

an operating system in a process for generating PDF files having improved security. The claimed techniques also leverage components of existing systems without the requirement of additional libraries.

18 Claims, 8 Drawing Sheets

(51) Int. Cl.
    *G06F 21/60* (2013.01)
    *G06F 21/62* (2013.01)
(58) Field of Classification Search
    USPC .......................................................... 713/171
    See application file for complete search history.

(56) References Cited

U.S. PATENT DOCUMENTS

| | | | |
|---|---|---|---|
| 8,059,300 B2 | 11/2011 | Kimura et al. | |
| 8,253,956 B2 | 8/2012 | Han | |
| 8,417,967 B2 | 4/2013 | Foster et al. | |
| 8,948,383 B2 | 2/2015 | Mano | |
| 9,037,865 B1 | 5/2015 | Gopalakrishna | |
| 9,122,435 B2* | 9/2015 | Shimada | G06F 3/1204 |
| 10,144,612 B2* | 12/2018 | Stelmack | B65H 54/106 |
| 2004/0125402 A1* | 7/2004 | Kanai | G06F 21/608 |
| | | | 358/1.15 |
| 2005/0210259 A1 | 9/2005 | Richardson | |
| 2006/0044589 A1* | 3/2006 | Nakagawaji | G06F 21/608 |
| | | | 358/1.14 |
| 2009/0106561 A1* | 4/2009 | Ejiri | G06F 21/62 |
| | | | 713/193 |
| 2009/0201526 A1* | 8/2009 | Kikuyama | G06F 21/608 |
| | | | 358/1.14 |
| 2011/0013219 A1* | 1/2011 | Nuggehalli | G06F 3/1203 |
| | | | 358/1.15 |
| 2012/0148323 A1* | 6/2012 | Shimada | G06F 3/1204 |
| | | | 400/76 |
| 2013/0088738 A1* | 4/2013 | Tajima | G06F 3/1204 |
| | | | 358/1.14 |
| 2016/0162703 A1 | 6/2016 | Kaufmann | |

OTHER PUBLICATIONS

Canaiy et al, An Open Source Print Management System that Works, Oct. 13, 2004, ACM, pp. 198-201.*
Huang et al, The Research and Design for Web Print Component Based on EJB Technology, IEEE, 2009, pp. 281-284.*
"International Search Report and Written Opinion Issued in PCT Application No. PCT/US2017/036663", dated Aug. 22, 2017, 11 Pages.
"Windows Data Protection", https://msdn.microsoft.com/en-us/library/ms995355.aspx, Published on: Oct. 2001, 12 pages.
Burzstein, et al., "Recovering Windows Secrets and EFS Certificates Offline", In Proceedings of the 4th USENIX conference on Offensive technologies, Aug. 9, 2010, pp. 1-9.
"How to Encrypt your Windows Phone", http://www.ferris.edu/HTMLS/mytechsupport/quickhelpguides/MobileDevices/Windows/EncryptingWindowsPhone.htm, Published on: May 10, 2015, 7 pages.
"How to store passwords to a remote web site?", http://security.stackexchange.com/questions/77052/how-to-store-passwords-to-a-remote-web-site, Published on: Mar. 27, 2015, 2 pages.
"Print Schema Specification", http://security.stackexchange.com/questions/77052/how-to-store-passwords-to-a-remote-web-site, Published on: May 9, 2013, 371 pages.
"Print Spooler API", https://msdn.microsoft.com/en-us/library/windows/desktop/ff686807(v=vs.85).aspx, Published on: Oct. 6, 2011, 2 pages.
"Print Ticket", https://msdn.microsoft.com/en-us/windows/hardware/drivers/print/print-ticket, Retrieved on: Oct. 12, 2016, 1 pages.

\* cited by examiner

ENHANCED MANAGEMENT OF PASSWORDS FOR PRINTING APPLICATIONS AND SERVICES

CROSS REFERENCE TO RELATED APPLICATION

This patent application claims the benefit of U.S. Provisional Patent Application Ser. No. 62/351,253 filed Jun. 16, 2016, entitled "Enhanced Management of Passwords for Printing Applications and Services," which is hereby incorporated in its entirety by reference.

BACKGROUND

Encryption technologies provide a number of benefits to many aspects of the computing industry. For instance, encrypted files may be shared between computers while providing controlled access to the contents of the files. In one illustrative example, a user of a client computer may encrypt a file using a password. The user may share the encrypted file with a remote computer with some certainty that the contents of the file will not be accessed without the password.

Although some encryption technologies provide a high level of security, one of the most common vulnerabilities of existing technologies is the communication of the password that is used to encrypt files. In some cases, when a password is communicated between software modules or components of a computing device, such communication can create opportunities for password information to be lifted. Thus, even when a computer utilizes complex encryption technologies, some systems are only as secure as the techniques that are used to communicate and manage a password. The need for continual improvement in technologies for communicating and managing passwords is just as important as the need for continual development of encryption technologies.

It is with respect to these and other considerations that the disclosure made herein is presented.

SUMMARY

Techniques described herein provide enhanced management of passwords for applications and services. Generally described, the techniques disclosed herein leverage the strength of existing security measures built into operating systems to generate and communicate encrypted passwords to enable components of a computing system to operate with a heightened level of security. In some configurations, the encryption of a password using strong keys that are associated with an identity improve the security of a computing device as well as improve the security, processing, and communication of secured documents and printing schemas. In some configurations, passwords for accessing documents are encrypted and embedded in printing schemas. The encrypted password is communicated between modules of an operating system. A PDF file can then be generated by a module receiving the encrypted password. The claimed techniques leverage components of existing systems without the requirement of additional libraries. In some configurations, encrypted data, such as an encrypted password, is generated by a universal application prior to communicating the password to a print system. Such features can increase the security of a computing device by encrypting certain types of data prior to communicating data between device components that may be vulnerable or otherwise easily compromised.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
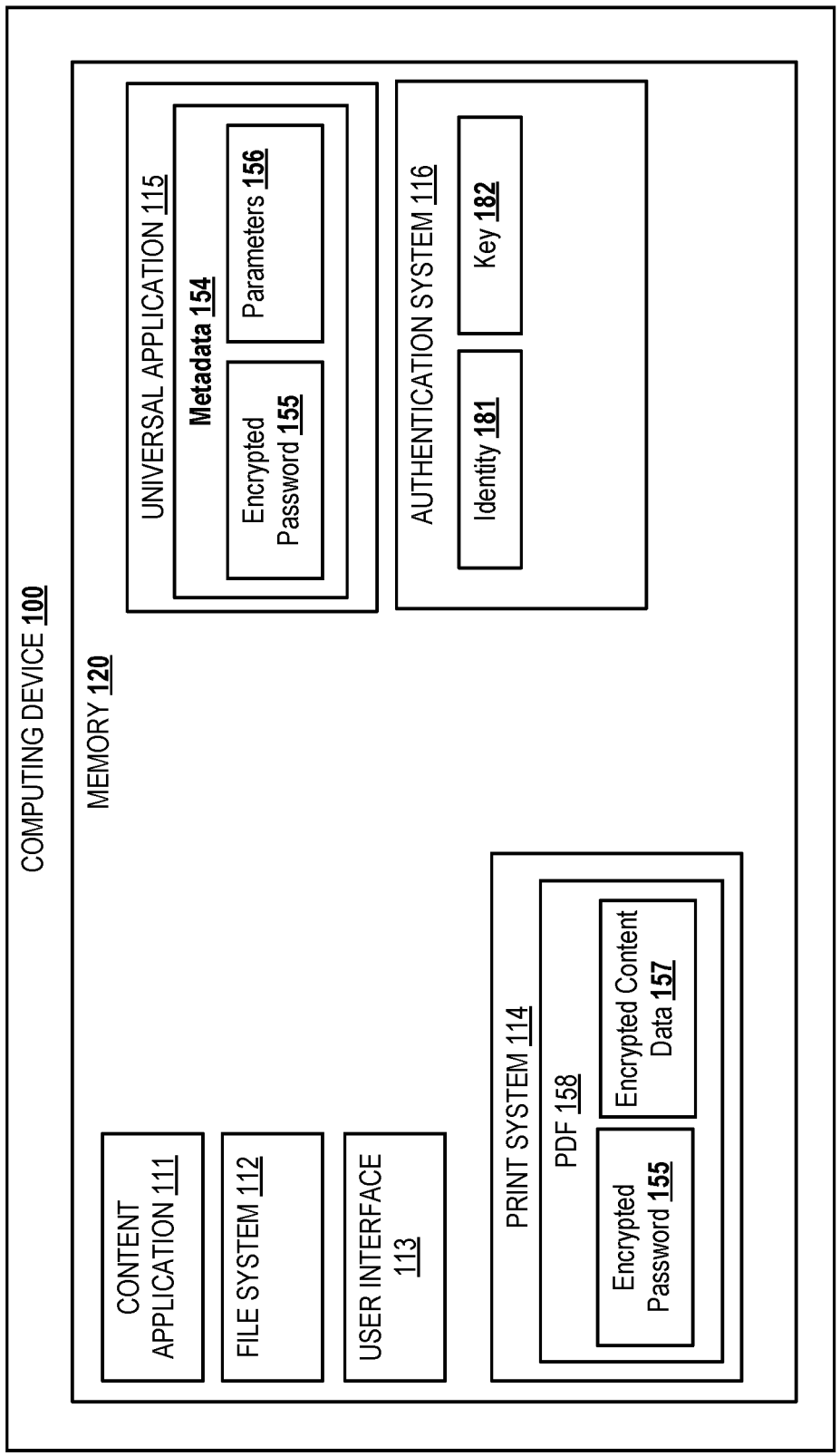
FIG. 1 is a block diagram showing aspects of one example computing device disclosed herein for providing enhanced management of passwords for applications and services.

Techniques described herein provide enhanced management of passwords for applications and services. Generally described, the techniques disclosed herein leverage the strength of existing security measures built into operating systems to generate and communicate encrypted passwords to enable components of a computing system to operate with a heightened level of security. As will be described in more detail below, encryption of a password using strong keys that are associated with an identity improve the security of a computing device as well as improve the security, processing, and communication of secured documents and printing schemas. In some configurations, passwords for accessing documents are encrypted and embedded in printing schemas. Encrypted passwords are created using strong keys of an operating system and the encrypted passwords are strategically communicated between particular modules of an operating system. In some configurations, the encrypted passwords are encrypted and embedded in one or more schemas for generating PDF files having improved security.

The techniques disclosed herein also leverage components of existing systems without the requirement of additional libraries.

It should be appreciated that the subject matter described herein can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Gestures, which can be in the form of any type of movement, performed by users of the computing devices can be captured by any type of sensor or input device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

By the use of the technologies described herein, enhanced management of passwords for applications and services is provided. Such technologies can improve the security of data and the security of a computing device by encrypting a password for a printing schema. Configurations disclosed herein can benefit a computing system by increasing the security of a portable document format file and increasing the security of a system by reducing number of occurrences that involve the communication of an unencrypted password between components of an operating system. Other technical effects other than those mentioned herein can also be realized from implementations of the technologies disclosed herein.

In the following description, references are made to the accompanying drawings that form a part hereof, and in which are shown by way of illustration specific configurations or examples. Referring to the system drawings, in which like numerals represent like elements throughout the several figures, aspects of a computing system, computer-readable storage medium, and computer-implemented methodologies for providing enhanced management of passwords for applications and services. As will be described in more detail below with respect to FIG. 8, there are a number of applications and services that can embody the functionality and techniques described herein.

FIG. 1 is a block diagram showing aspects of one example computing device 100 (also referred to herein as a "system 100") disclosed herein for providing enhanced management of passwords for applications and services. In this illustrative example, the computing device 100 can include a local memory 120, also referred to herein as a "computer-readable storage medium," for storing data and code modules, such as a content application 111, file system 112, user interface module 113, a print system 114, a universal application 115, and an authentication system 116. This example is provided for illustrative purposes and is not to be construed as limiting. It can be appreciated that the computing device 100 can include any number of components, systems, and/or resources. It can also be appreciated that some of the components and data listed herein can be stored and/or executed on a remote computing device in communication with the computing device 100.

In some configurations, the content application 111 can include any application suitable for processing and communicating a file. In some illustrative examples, the content application 111 can include, but is not limited to, a word processor, a spreadsheet program, a browser, a presentation program, or the like. Examples of content applications 111 can include FIREFOX, CHROME, SHEETS, DOCS, etc. As will be described below, the content application 111 can generate content data by the use of one or more functions, including the execution of a print function. In one illustrative example, a "print to file" command can cause the generation of content data.

The file system 112 can include one or more modules for managing and storing files of the computing device 100. The file system 112 can include functionality for storing and managing files on a local device and/or a remote device stored on a service or remote computer. Examples of various file systems 112 can include components from an ANDROID operating system, an iOS operating system, a WINDOWS operating system, to name a few.

The user interface module 113 can include one or more modules for generating a graphical user interface for display on a display device. The user interface module 113 can also include one or more modules for generating an interface that may be in the form of a generated voice using natural language technologies. The user interface module 113 can also be configured to receive input data from a user using any number of suitable mechanisms including a voice input, a keyboard input, a mouse input, etc. The user interface module 113 can interpret any type of input for generating text data, such as a password and other types of input that can define fine parameters for a portable document format (PDF) file.

The print system 114 can include any type of system for processing, managing, and communicating passwords, encryption keys, content data, PDF files, and other data. In some configurations, the print system 114 can include a service, which can be referred to as a spooler. Among other operations, the print system 114 is configured to receive and process an encryption key and an encrypted password to generate a password. In addition, the print system 114 is configured to utilize the password and content data to generate encrypted content data. The print system 114, as described below, is also configured to assemble different types of data, such as an encrypted password, parameter data, and encrypted content data, to generate a secured PDF file.

The universal application 115 can include one or more modules for processing and communicating passwords, encrypted passwords, parameter data, and content data. The universal application 115 can also receive, process, and communicate encryption keys. In general, the universal application 115 can be based on a platform-homogeneous application architecture, allowing the universal application 115 to run on multiple types of devices. Irrespective of the underlying application architecture, the universal application 115 is configured to perform the techniques disclosed herein.

The authentication system 116 can be any suitable component of an operating system that stores, processes, and communicates encryption keys. In one illustrative example, the authentication system 116 can associate an identity 181 with an encryption key 182. The authentication system 116 can verify a user by the use of one or more credentials of an identity to allow the generation, communication, and processing of one or more encryption keys 182 associated with the identity.

In some configurations, the file system 112, user interface module 113, print system 114, universal application 115, and/or the authentication system 116 are part of an operating system. Examples of various operating systems having such systems and modules include, but are not limited to, the ANDROID operating system, the iOS operating system, the WINDOWS operating system, to name a few.

Figure 2:
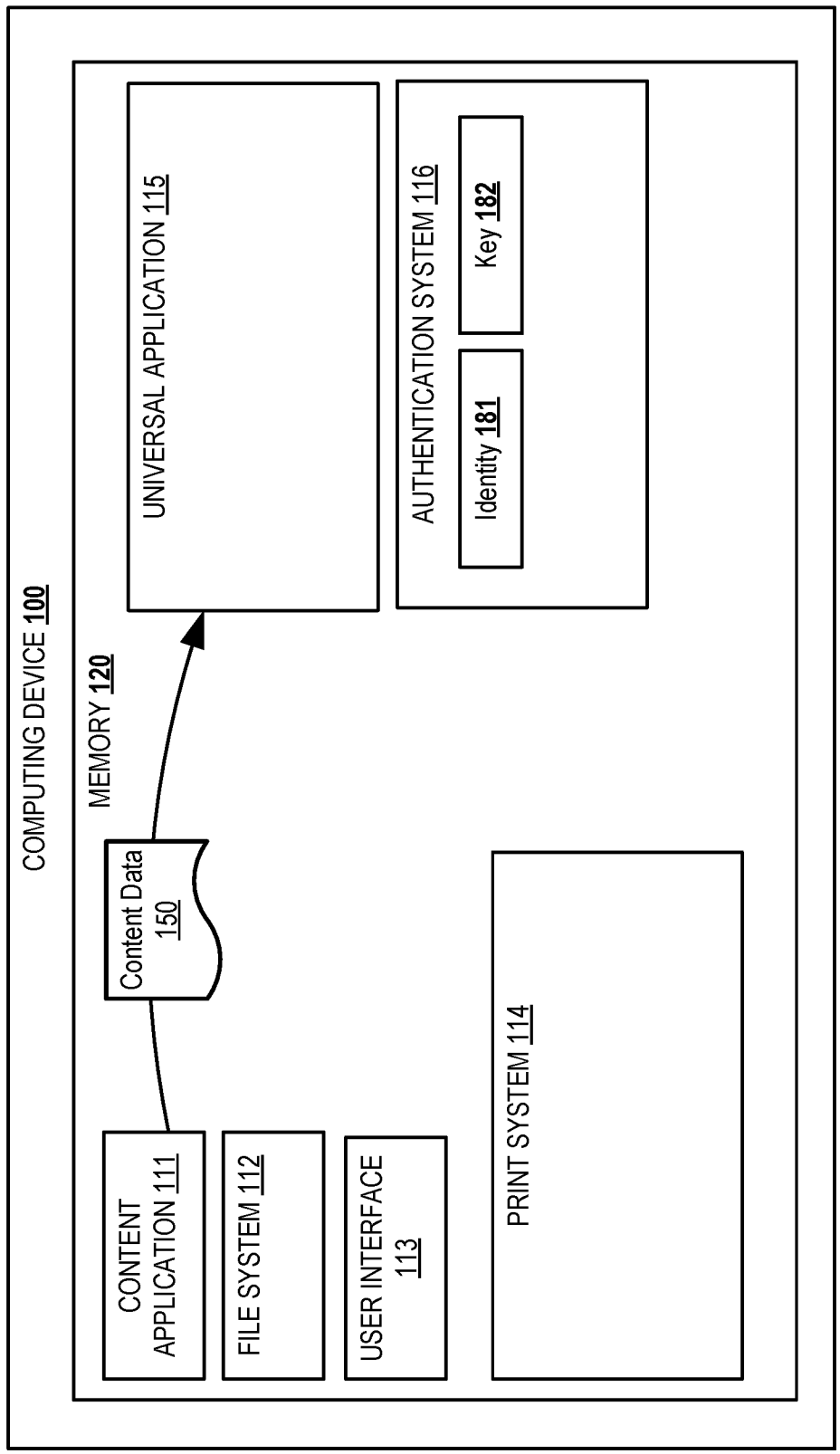
FIG. 2 is a block diagram of the computing device shown in FIG. 1 communicating content data.

Referring now to FIGS. 2-6, an example data flow scenario involving the computing device 100 is shown and described. In this example, a user operating the content application 111 desires to generate a password-protected PDF file. In this example, the user invokes one or more commands, such as a "print to file" or a "print to PDF" command. As shown in FIG. 2, upon receiving a command to generate a password-protected PDF file, content data 150 is communicated from the content application 111 to the universal application 115. In one illustrative example, if the content application 111 is a web browser, the content data 150 can include at least a portion of a webpage that selected for the print command.

Figure 3:
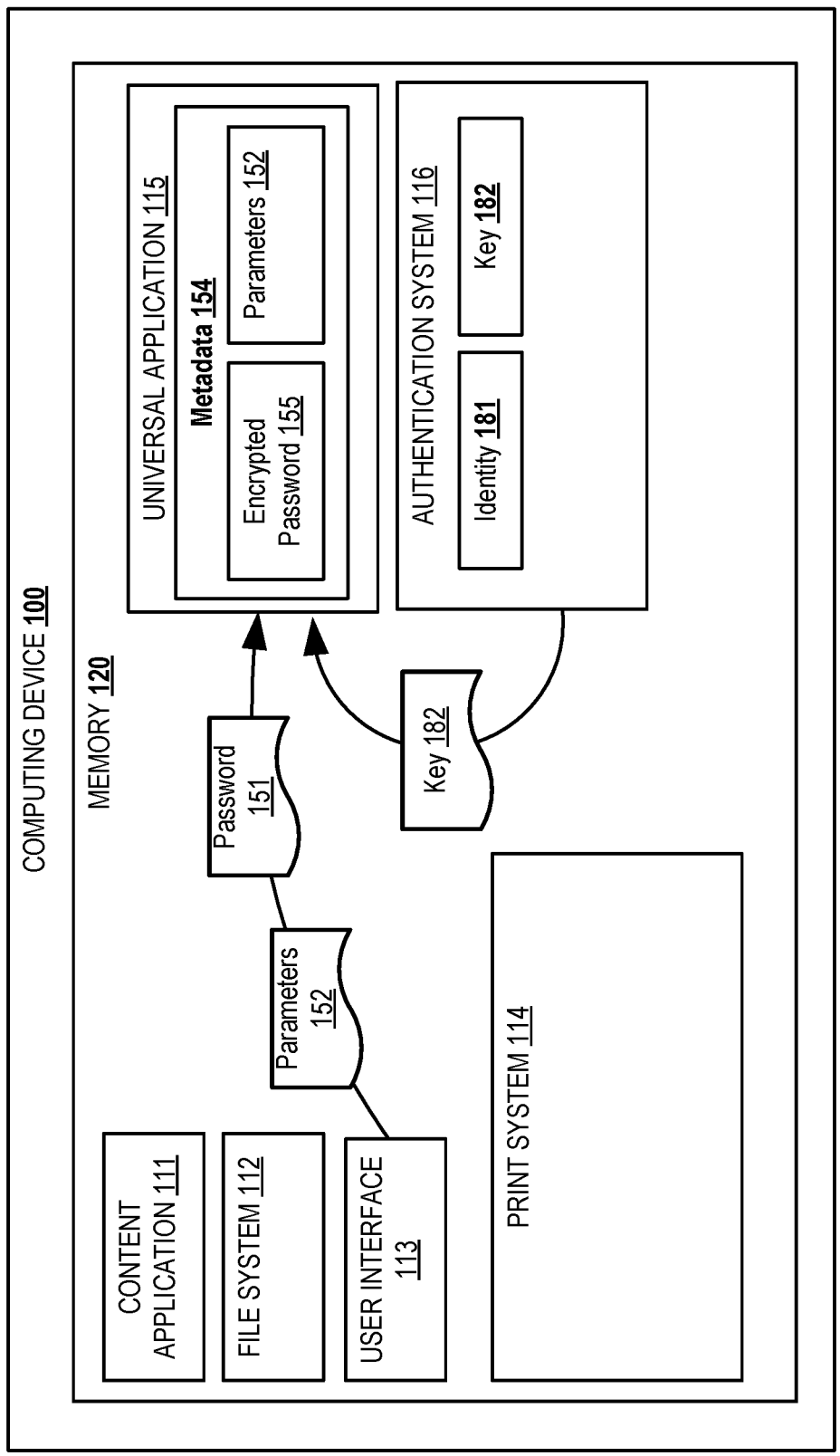
FIG. 3 is a block diagram of the computing device shown in FIG. 1 communicating parameters for a portable document format, a password, and a security key.

As shown in FIG. 3, the user interface module 113 can communicate a password 151 and one or more parameters 152 ("parameter data 152") to the universal application 115. To facilitate such functionality, in one example, the user interface module 113 can prompt the user to enter a password 151 and one or more parameters 152 in association with the content data 150. The user interface module 113 can receive any suitable password 151 that can be used to encrypt the content data 150. The parameters 152 can include any number of aspects associated with the content data 150, such as permissions or formatting requirements desired by the user. As will be described in more detail below, when the content data 150 is embodied in a file, such as a PDF file, the parameters 152 define attributes of the file. For instance, the parameters 152 can indicate a margin size, page size, a page type, print orientation, etc. In other examples, the parameters 152 can indicate permissions for a recipient of the PDF file. For example, the permissions can permit the recipient of a PDF file containing the content data 150 to copy the contents, print the contents, modify the contents, modify comments within the file, etc. These examples are provided for illustrative purposes and are not to be construed as limiting. It can be appreciated that any type of parameter 152 can be received from a user and communicated to the universal application 115.

Also shown in FIG. 3, an encryption key 182 is communicated from the authentication system 116 to the universal application 115. To facilitate such functionality, the authentication system 116 can store an encryption key 182 in association with an identity 181 associated with the user. The authentication system 116 can communicate the encryption key 182 to the universal application 115 when appropriate credentials associated with the identity 181 are provided by the user.

Upon receiving the password 151 and the encryption key 182, the universal application 115 utilizes the password 151 and the encryption key 182 to generate an encrypted password 155. Any suitable encryption technology can be utilized for generating the encrypted password 155. Upon generating the encrypted password 155, the universe application 115 can generate metadata 154 that includes the encrypted password 155 and the parameters 152. In some configurations, the metadata 154 is referred to in the industry as a Print Ticket schema.

Figure 4:
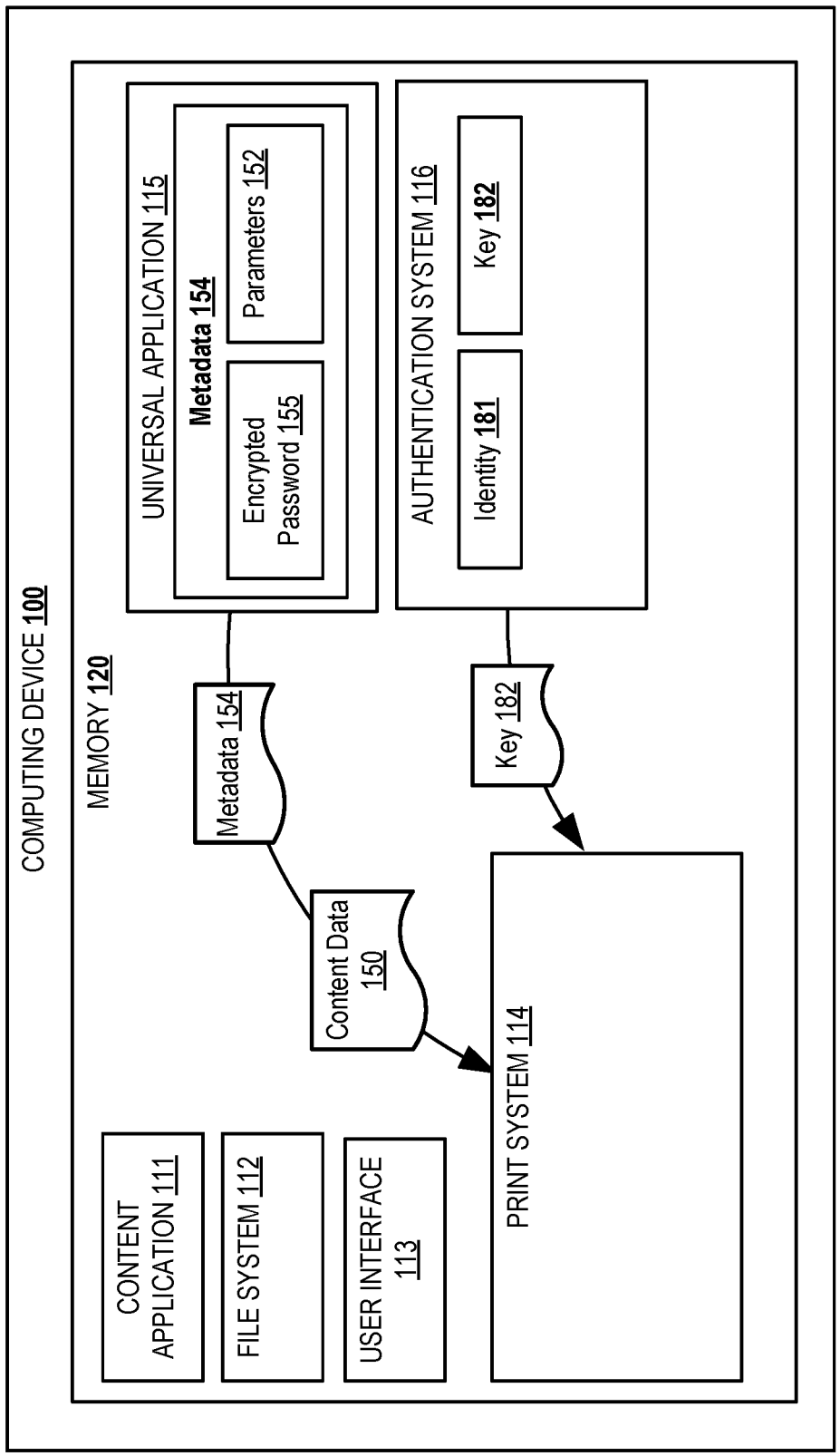
FIG. 4 is a block diagram of the computing device shown in FIG. 1 communicating metadata comprising an encrypted password, content data, and a security key.

As shown in FIG. 4, upon generating the metadata 154, the universal application 115 communicates the metadata 154 and the content data 150 to the print system 114 for further processing. In addition, as shown in FIG. 4, the encryption key 182 can also be communicated from the authentication system 116 to the print system 114.

Figure 5:
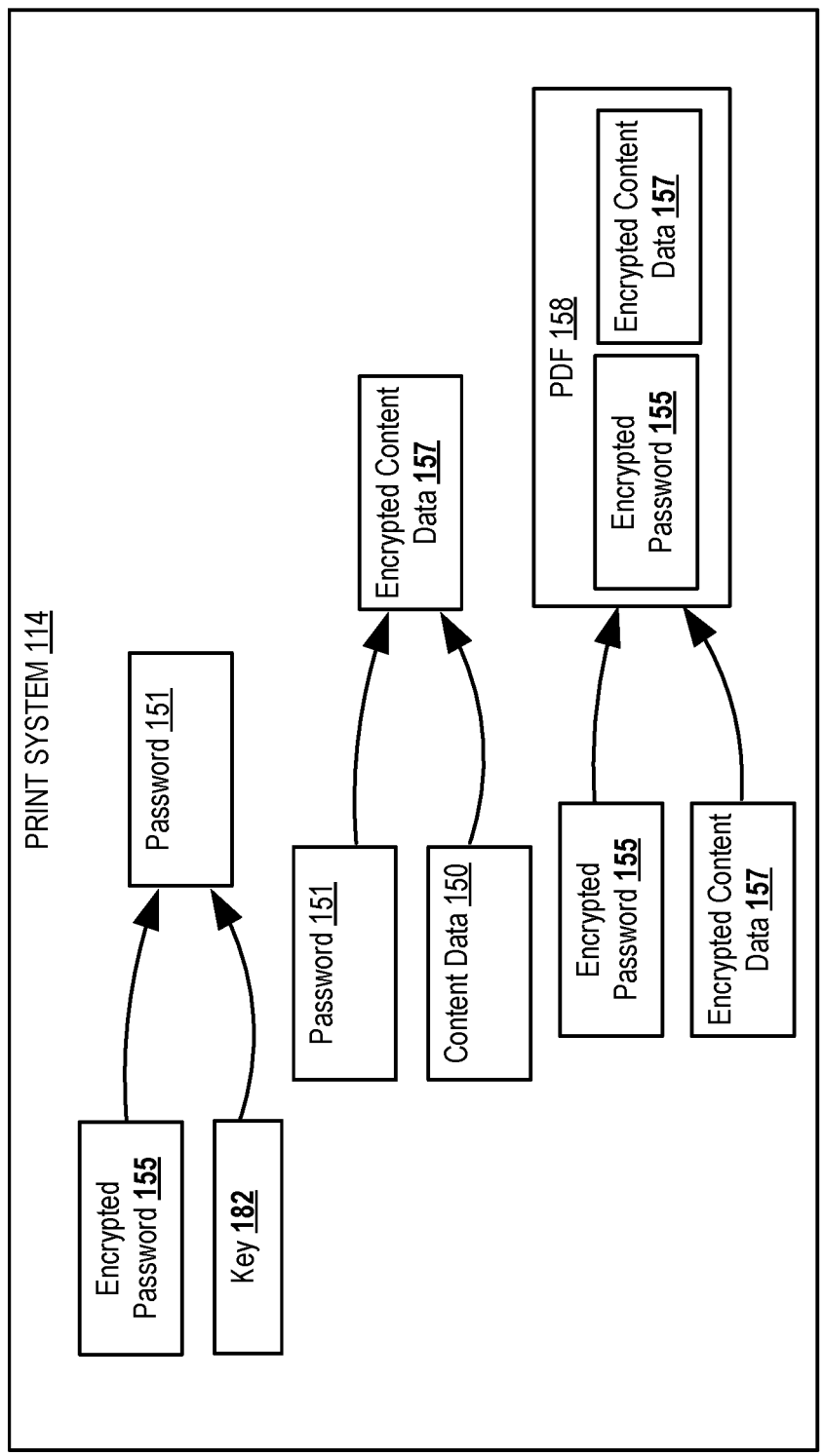
FIG. 5 is a block diagram showing aspects of a process for generating a file having encrypted content and an encrypted password.

As shown in FIG. 5, the print system 114 utilizes the received data to obtain the password 151 and encrypt the content data 150 to generate encrypted content data 157. More specifically, the print system 114 utilizes the encryption key 182 to decrypt the encrypted password 155 to generate the password 151. In turn, the password 151 is utilized, along with any suitable encryption technology, to encrypt the content data 150 to generate encrypted content data 157. It can be appreciated that the communication of the encrypted password 155 between the universal application 115 and the print system 114 increases the security of the system 100, as the communication of the password 151 between components can create one or more vulnerabilities.

Also shown in FIG. 5, the print system 114 utilizes the encrypted password 155 and the encrypted content data 157 to generate a PDF file 158. In some configurations, the PDF file 158 includes the encrypted content data 157, the parameter data, and the encrypted password 155. It can be appreciated that the generated PDF file 158 can be in compliance with one or more standards, including the ISO standard. Although a PDF file 158 is utilized to illustrate aspects of the present disclosure, it can be appreciated that any suitable formatting technology can be utilized with the techniques disclosed herein.

Figure 6:
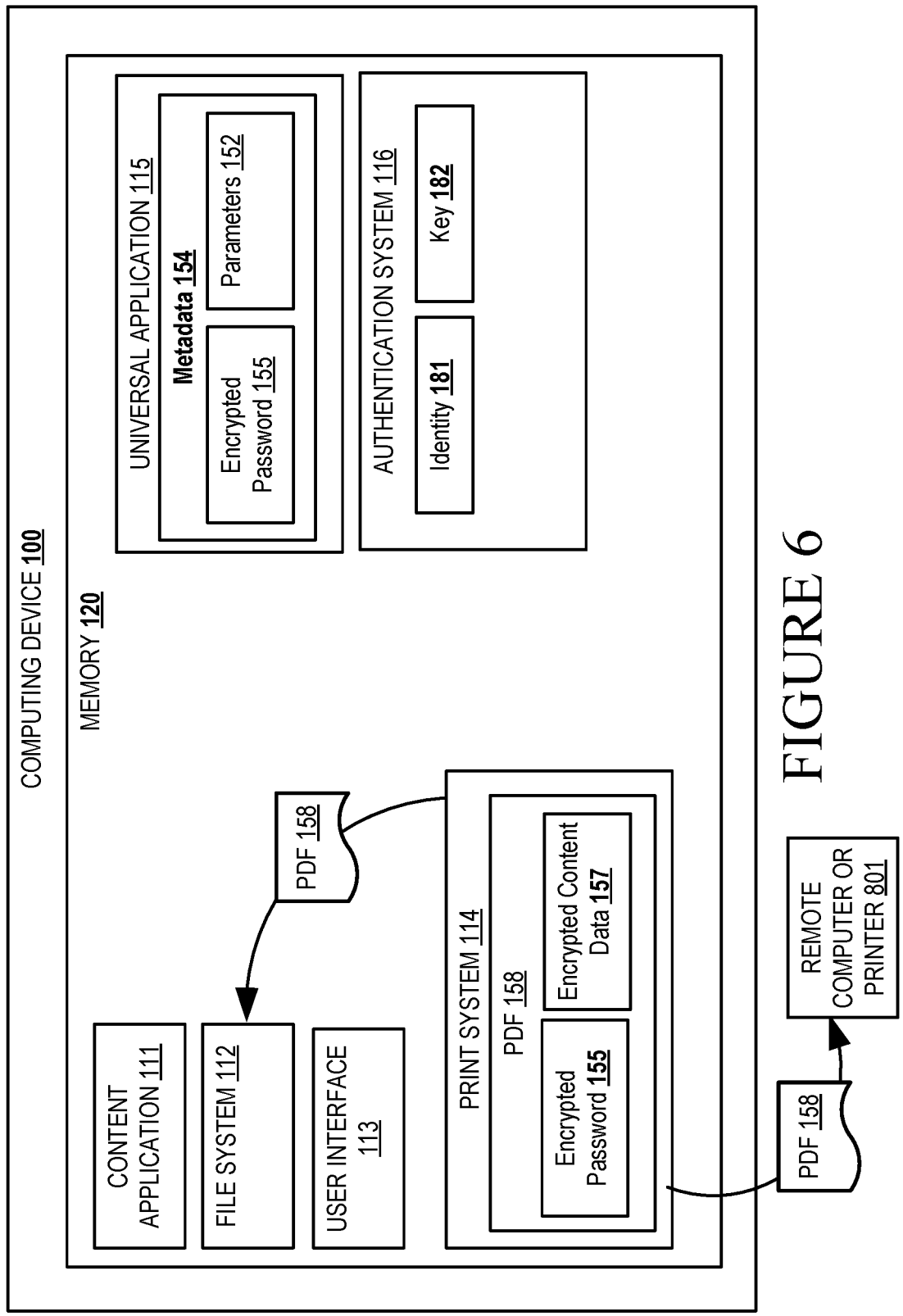
FIG. 6 is a block diagram of the computing device shown in FIG. 1 communicating a generated file to a file system, remote computer, or a printer.

Once the PDF file 158 is generated, as shown in FIG. 6, the print system 114 can communicate to, and store, the PDF file 158 with any resource, such as the file system 112. It can be appreciated that the PDF file 158 can be stored on a network drive, a local drive, a remote storage service associated with an account or any other storage medium which may be on the system 100 or a remote computer (801 of FIG. 8). In some configurations, the PDF file 158 is communicated to a printer 801.

Figure 7:
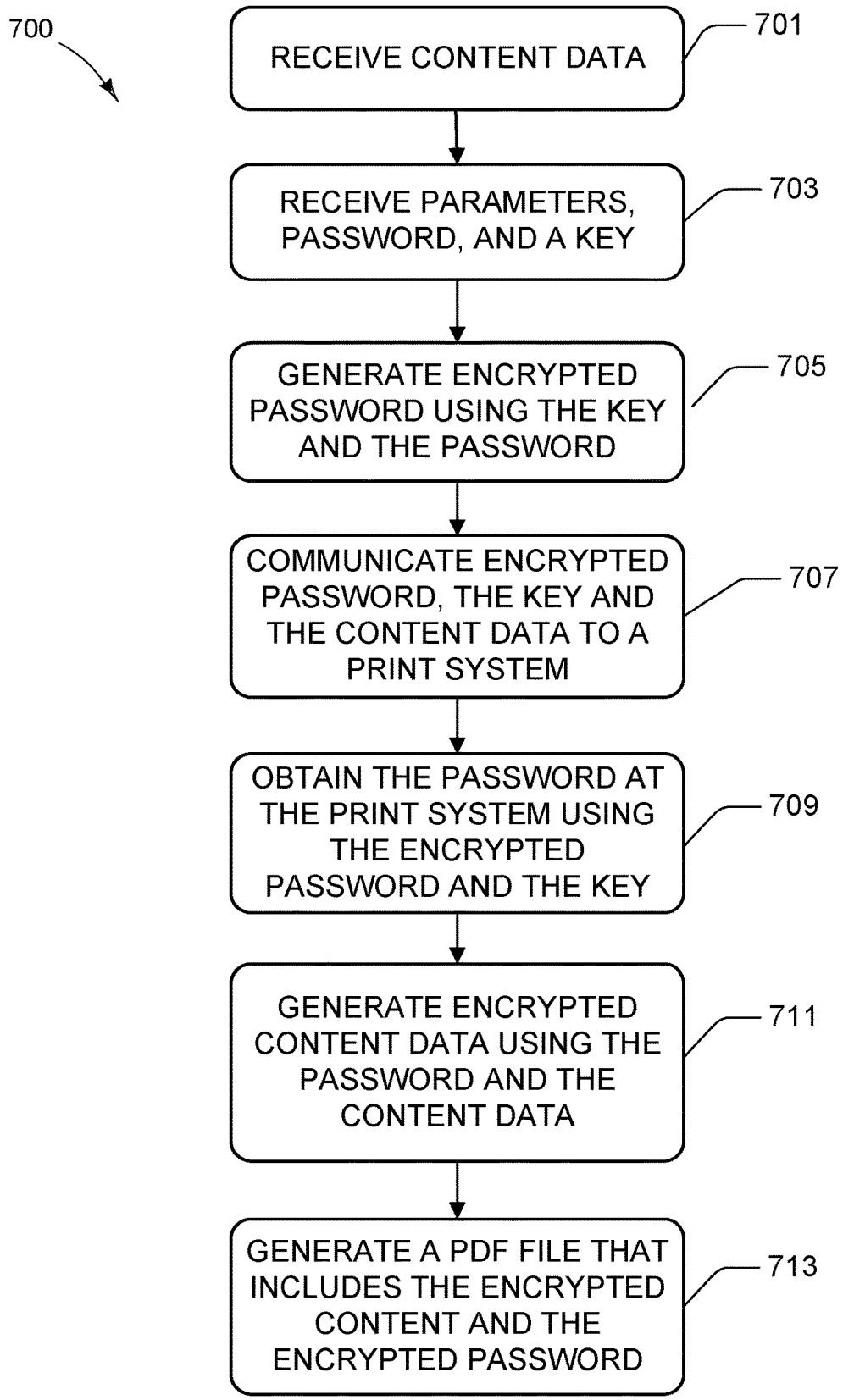
FIG. 7 illustrates a flow diagram of a routine for enabling providing enhanced management of passwords for applications and services.

Turning now to FIG. 7, aspects of a routine 700 for enhanced management of passwords for applications and services are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application, component and/or circuit, such as the content application 111, file system 112, user interface module 113, a print system 114, a universal application 115, and/or the authentication system 116. In some configurations, the content application 111, file system 112, user interface module 113, a print system 114, a universal application 115, and/or the authentication system 116 can be a dynamically linked library (DLL), a statically linked library, functionality produced by an application programming interface (API), a compiled program, an interpreted program, a script or any other executable set of instructions. Data, such as the content data 150, the password 151, the metadata 154, the encrypted password 155, and the encrypted content data 157, and other data, received or processed by the content application 111, file system 112, user interface module 113, a print system 114, a universal application 115, and/or the authentication system 116 can be stored in a data structure in one or more memory components. Data can be retrieved from the data structure by addressing links or references to the data structure.

Figure 8:
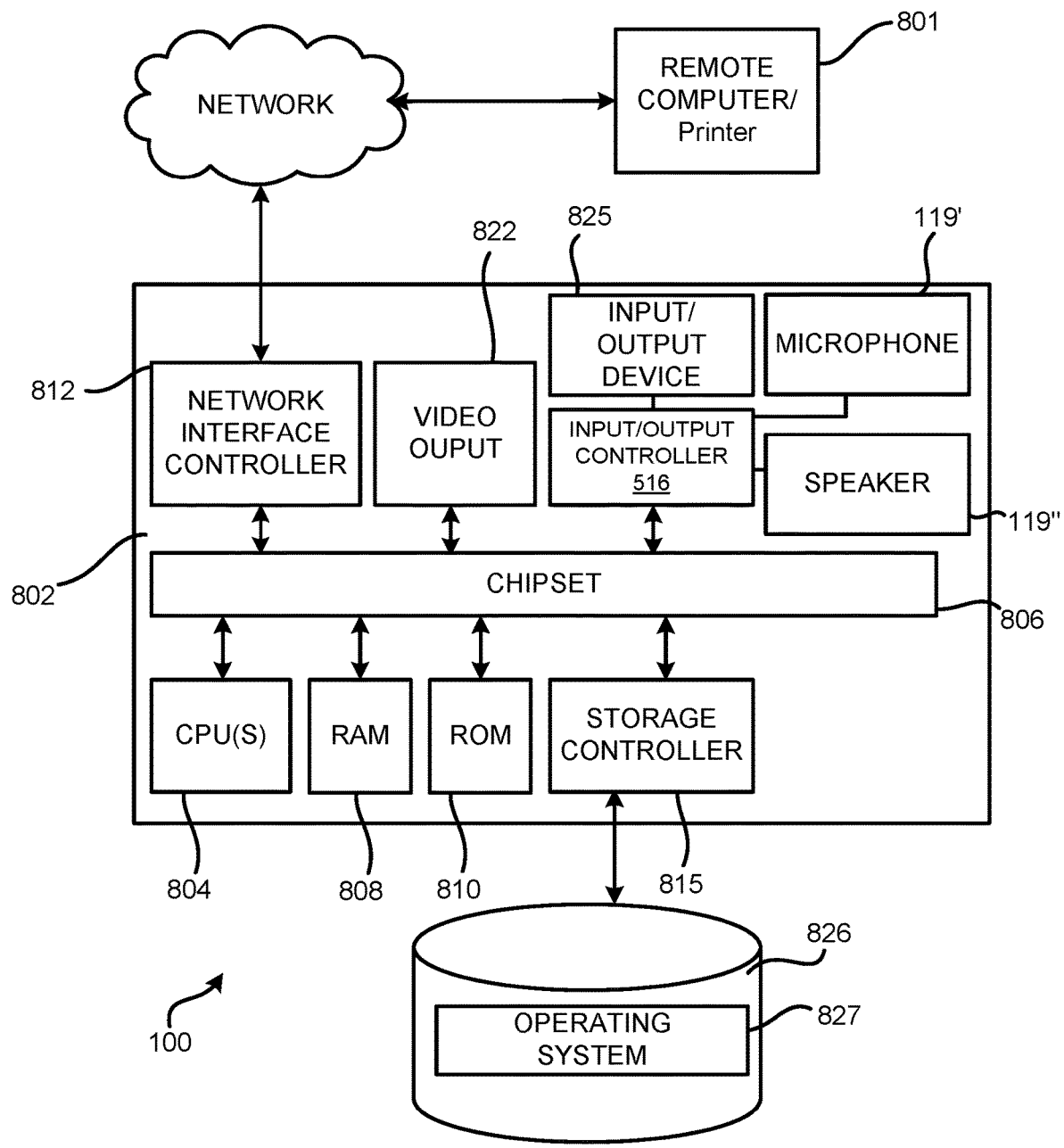
FIG. 8 is a computer architecture diagram illustrating an illustrative computer hardware and software architecture for a computing system capable of implementing aspects of the techniques and technologies presented herein.

Although the following illustration refers to the components of FIG. 1 and FIG. 8, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

With reference to FIG. 7, the routine 700 begins at operation 701, where the universal application 115 receives the content data 150 from the content application 111. As summarized above, the content data 150 can include at least a portion of content that is processed by the content application 111, which can include a document, spreadsheet, webpage, or any other type of information suitable for printing and/or sharing.

Next, at operation 703, the universal application 115 receives an encryption key 182, a password 151 and one or more parameters 152. As summarized above, the password 151 and the parameters 152 can be obtained from one or more components receiving information from a user. The encryption key 182 can come from an authentication system 116 that stores encryption keys in association with an identity associated with the user.

Next, at operation 705, the universal application 115 utilizes the encryption key 182 to encrypt the password 151 thereby generating an encrypted password 155. Any number of suitable encryption technologies can be utilized for operation 705.

Next, at operation 707, the universal application 115 communicates the encrypted password 155 and the content data 150 to the print system 114. In addition, in some configurations, operation 707 can include the communication of the encryption key 182 from the authentication system 116 to the print system 114. In some configurations, the encrypted password 155 is embedded in a printing schema, and wherein the encrypted password 155 is embedded in the printing schema to function as salt data. In addition, by embedding an encrypted password in a printing schema, the techniques disclosed herein also leverage components of existing systems without the requirement of additional libraries. This is possible because programs that read the schemas will ignore incompatible data instead of throwing errors and exceptions. However, programs configured to read the encrypted password 155 can utilize such data.

Next, at operation 709, the print system 114 utilizes the encryption key 182 and the encrypted password 155 to obtain the password 151. In operation 709 any suitable technology can be utilized to decrypt the encrypted password 155.

Next, at operation 711, the print system 114 utilizes the password 151 to encrypt the content data 150 to generate the encrypted content data 157. As summarized above, any suitable encryption technology can be utilized for operation 711.

Next, at operation 713, the print system 114 generates a PDF file 158 that includes the encrypted content data 157 and the encrypted password 155. As summarized above, the PDF file 158 can be configured to comply with one or more standard such as the ISO standard. Operation 713 can also involve other processes for storing and communicating the PDF file 158. For instance, the PDF file 158 can be stored in the file system 112 and/or communicated (transmitted) to a remote computing device (FIG. 801), which may be in the form of a personal computer, a printer, a plotter, etc.

A recipient of the PDF file 158 can access the content data 150 from the PDF file 158 by the use of the password 151. In addition, a user associated with the appropriate identity can obtain the encryption key 182 and decrypt the encrypted password 155 to obtain the password 151. Such a user can then use the password 151 to decrypt the encrypted content data 157 to obtain the content data 150. Although these examples refer to the generated file as a PDF file, the generated file can also be a spool file 158. In configurations where a spool file 158 or a PDF file 158 generated and communicated to a printer or remote computer, the printer or remote computer can utilize the password 151 to print or otherwise process the contents of the spool file 158 or the PDF file 158. A spool file 158 or the PDF file 158 can also be saved to a file system.

FIG. 8 shows additional details of an example computer architecture for the components shown in FIG. 1 capable of executing the program components described above for providing enhanced management of passwords for applications and services. The computer architecture shown in FIG.

8 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 8 may be utilized to execute any of the software components described above. Although some of the components described herein are specific to the computing devices 100, it can be appreciated that such components, and other components may be part of any suitable remote computer 801, such as the authentication system 115.

The computing device 100 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 100.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 100. The chipset 806 may further provide an interface to a computer-readable storage medium such as a read-only memory ("ROM") 810 or non-volatile RAM ("NVRAM") for storing basic routines that help to startup the computing device 100 and to transfer information between the various components and devices. The ROM 810 or NVRAM may also store other software components necessary for the operation of the computing device 100 in accordance with the embodiments described herein.

The computing device 100 may operate in a networked environment using logical connections to remote computing devices and computer systems through a network, such as the local area network. The chipset 806 may include functionality for providing network connectivity through a network interface controller (NIC) 812, such as a gigabit Ethernet adapter. The NIC 812 is capable of connecting the computing device 100 to other computing devices over the network. It should be appreciated that multiple NICs 812 may be present in the computing device 100, connecting the computer to other types of networks and remote computer systems. The network allows the computing device 100 to communicate with remote services and servers, such as the remote computer 801. As can be appreciated, the remote computer 801 may host a number of services such as a printing service, a file sharing service, etc. In addition, as described above, the remote computer 801 may mirror and reflect data stored on the computing device 100 and host services that may provide data or processing for the techniques described herein.

The computing device 100 may be connected to a mass storage device 826 that provides non-volatile storage for the computing device. The mass storage device 826 may store system programs, application programs, other program modules, and data, which have been described in greater detail herein. The mass storage device 826 may be connected to the computing device 100 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 100 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 100 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 100 may further read information from the mass storage device 826 by detecting the physical states or characteristics of one or more particular locations within the physical storage units.

In addition to the mass storage device 826 described above, the computing device 100 may have access to other computer-readable media to store and retrieve information, such as program modules, data structures, or other data. Thus, although the content application 111, file system 112, user interface module 113, a print system 114, a universal application 115, the authentication system 116, other data and other modules are depicted as data and software stored in the mass storage device 826, it should be appreciated that these components and/or other modules may be stored, at least in part, in other computer-readable storage media of the computing device 100. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 100. For purposes of the claims, the phrase "computer storage medium," "computer-readable storage medium," and variations thereof, does not include waves or signals per se and/or communication media.

The mass storage device 826 may store an operating system 827 utilized to control the operation of the computing device 100. According to one embodiment, the operating system comprises one or more components described herein. According to another embodiment, the operating system comprises the WINDOWS operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 100, such as content application 111, file system 112, user interface module 113, a print system 114, a universal application 115, the authentication system 116, and/or any of the other software components and data described above. The mass storage device 826 might also store other programs and data not specifically identified herein.

In one embodiment, the mass storage device 826 or other computer-readable storage media is encoded with computer-executable instructions which, when loaded into the computing device 100, transform the computer from a general-purpose computing system into a special-purpose computer capable of implementing the embodiments described herein. These computer-executable instructions transform the computing device 100 by specifying how the CPUs 804 transition between states, as described above. According to one embodiment, the computing device 100 has access to computer-readable storage media storing computer-executable instructions which, when executed by the computing device 100, perform the various routines described above with regard to FIG. 7 and the other figures. The computing device 100 might also include computer-readable storage media for performing any of the other computer-implemented operations described herein.

The computing device 100 may also include one or more input/output controllers 816 for receiving and processing input from a number of input devices, such as a keyboard, a mouse, a microphone, a headset, a touchpad, a touch screen, an electronic stylus, or any other type of input device. Also shown, the input/output controllers 816 is in communication with an input/output device 825. The input/output controller 816 may provide output to a display, such as a computer monitor, a flat-panel display, a digital projector, a printer, a plotter, or other type of output device. The input/output controller 816 may provide input communication with other devices such as a microphone 119', a speaker 119", game controllers and/or audio devices. In addition, or alternatively, a video output 822 may be in communication with the chipset 806 and operate independent of the input/output controllers 816. It will be appreciated that the computing device 100 may not include all of the components shown in FIG. 8, may include other components that are not explicitly shown in FIG. 8, or may utilize an architecture completely different than that shown in FIG. 8.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for improving security of an operating system, comprising:
    receiving, at a universal application, content data from a content application;
    receiving, at the universal application, an encryption key associated with an identity, wherein the encryption key is received from an authentication system;
    receiving, at the universal application, parameter data defining aspects of a file;
    receiving, at the universal application, a password;
    generating, at the universal application, an encrypted password based, at least in part, on the password and the encryption key associated with the identity;
    communicating the content data, the encrypted password, and the parameter data from the universal application to a spooler, wherein the communication of the encrypted password between the universal application and the spooler improves the security of the operating system, wherein the encrypted password is embedded in a printing schema, and wherein communicating the encrypted password to the spooler comprises, communicating the printing schema from the universal application to the spooler;
    receiving, at the spooler, the encryption key associated with the identity, wherein the encryption key is received from the authentication system;
    generating, at the spooler, the password from the encrypted password and the encryption key associated with the identity;
    generating, at the spooler, encrypted content data based, at least in part, on the password and the content data;
    generating, at the spooler, the file comprising the encrypted content data and the encrypted password; and
    transmitting the file comprising the encrypted content data and the encrypted password to a file system component or a remote computing device.

2. The method of claim 1, wherein the encrypted password is embedded in a printing schema, and wherein communicating the encrypted password to the spooler comprises, communicating the printing schema from the universal application to the spooler.

3. The method of claim 1, wherein the parameter data and the encrypted password are embedded in a printing schema, and wherein communicating the encrypted password and the parameter data to the spooler comprises, communicating the printing schema from the universal application to the spooler.

4. The method of claim 3, wherein the encrypted password is embedded in a printing schema, and wherein the encrypted password functions as salt data.

5. The method of claim 1, wherein the parameter data defines one or more formatting characteristics of the content data, and wherein the parameter data indicates one or more permissions for operations that can be performed on the content data of the file.

6. The method of claim 1, further comprising:
obtaining, at the spooler, the encryption key from an operating system component based, at least in part, on credentials associated with the identity;
decrypting, at the spooler, the encrypted password with the encryption key to generate the password; and
decrypting the encrypted data using the password to generate the content data.

7. A computing device, comprising:
a processor;
a memory comprising a universal application, a content application, and a spooler, the memory having computer-executable instructions stored thereupon which, when executed by a computing device, cause the processor to
receive, at the universal application, content data from the content application;
receive, at the universal application, an encryption key;
receive, at the universal application, parameter data defining aspects of a portable document format file;
receive, at the universal application, a password;
generate, at the universal application, an encrypted password based, at least in part, on the password and the encryption key;
generate schema data, wherein the schema data comprises the encrypted password and the parameter data;
communicate the content data and the schema data comprising the encrypted password and the parameter data from the universal application to a spooler, wherein the communication of the schema data comprising the encrypted password and the parameter data from the universal application to the improves security of the operating system, wherein the schema data further causes the spooler to generate the password from the encrypted password using an encryption key that is retrieved in association with an identity, wherein the encrypted password is embedded in the schema data, and wherein communicating the encrypted password to the spooler comprises, communicating the schema data from the universal application to the spooler;
generate, at the spooler, encrypted content data based, at least in part, on the password and the content data;
generate, at the spooler, the file comprising the encrypted content data and the encrypted password; and
transmit the file comprising the encrypted content data and the encrypted password to a file system component or a remote computing device.

8. The computing device of claim 7, wherein the computer-executable instructions further cause the processor to:
communicate the content data and the schema data, which includes the encrypted password and the parameter data, from the universal application to the spooler;
receive, at the spooler, the encryption key;
generate, at the spooler, the password from the encrypted password and the encryption key;
generate, at the spooler, encrypted content data based, at least in part, on the password and the content data; and
generate, at the spooler, the portable document format file comprising the encrypted content data and the encrypted password.

9. The computing device of claim 7, wherein the encryption key is communicated from an operating system component, and wherein the encryption key is associated with an identity at the operating system component.

10. The computing device of claim 7, wherein the parameter data defines one or more formatting characteristics of the content data.

11. The computing device of claim 7, wherein the parameter data indicates one or more permissions for operations that can be performed on the content data of the portable document format file.

12. The computing device of claim 7, wherein the encrypted password is embedded to in the schema data to function as salt data.

13. The computing device of claim 7, wherein the computer-executable instructions further cause the processor to:
obtain, at the spooler, the encryption key from an operating system component based, at least in part, on credentials associated with the identity;
decrypt at the spooler, the encrypted password with the encryption key to generate the password; and
decrypt the encrypted data using the password to generate the content data.

14. A computer-readable storage medium having computer-executable instructions stored thereupon which, when executed by one or more processors of a computing device, cause the one or more processors of the computing device to:
receive, at a universal application, content data from the content application;
receive, at the universal application, an encryption key;
receive, at the universal application, parameter data defining aspects of a portable document format file;
receive, at the universal application, a password;
generate, at the universal application, an encrypted password based, at least in part, on the password and the encryption key;
generate schema data, wherein the schema data comprises the encrypted password and the parameter data;
communicate the content data and the schema data comprising the encrypted password and the parameter data from the universal application to a spooler, wherein the communication of the schema data comprising the encrypted password and the parameter data from the universal application to the improves security of the operating system, wherein the schema data further causes the spooler to generate the password from the encrypted password using an encryption key that is retrieved in association with an identity, wherein the encrypted password is embedded in the schema data, and wherein communicating the encrypted password to the spooler comprises, communicating the schema data from the universal application to the spooler;
generate, at the spooler, encrypted content data based, at least in part, on the password and the content data;
generate, at the spooler, the file comprising the encrypted content data and the encrypted password; and
transmit the file comprising the encrypted content data and the encrypted password to a file system component or a remote computing device.

15. The computer-readable storage medium of claim 14, wherein the encryption key is communicated from the operating system component, and wherein the encryption key is associated with the identity at the operating system component.

16. The computer-readable storage medium of claim 14, wherein the parameter data defines one or more formatting characteristics of the content data.

17. The computer-readable storage medium of claim 14, wherein the parameter data indicates one or more permissions for operations that can be performed on the content data of the portable document format file.

18. The computer-readable storage medium of claim 14, wherein the encrypted password is embedded to in the schema data to function as salt data.

* * * * *